Patented June 16, 1931

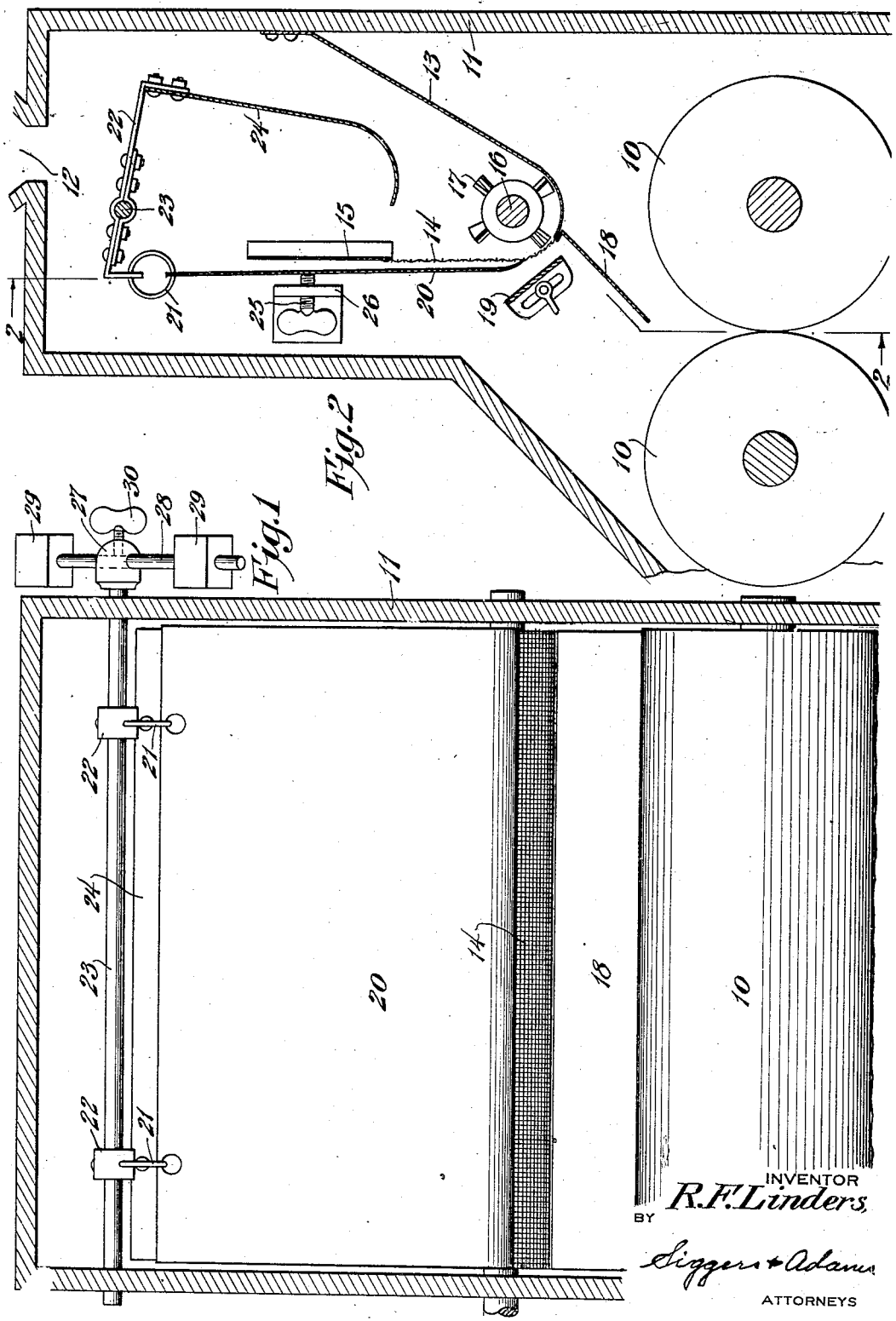

1,810,773

UNITED STATES PATENT OFFICE

RALPH F. LINDERS, OF BALDWIN, ILLINOIS

GRAIN FEEDER

Application filed February 7, 1929. Serial No. 338,250.

This invention relates to grain feeders for mills and, among other objects, aims to provide improved feeding mechanism for automatically distributing and controlling the feed to grinding or crushing rolls to produce a more uniform product.

Other objects and advantages of the invention will appear in the specification considered in connection with the accompanying drawings showing the preferred form of apparatus and in which, Fig. 1 is a sectional view of a feed hopper, showing the front of the feed controlling mechanism in elevation; and Fig. 2 is a sectional view taken on the line 2—2 of Fig. 1.

Referring particularly to the illustrated form of the invention the feed controlling or regulating mechanism is shown adapted to distribute the grain evenly throughout the length of the grinding or crushing rolls 10 and to regulate the flow or discharge from the feed hopper according to the rate of flow or feed into the hopper. Herein, the improved mechanism is mounted in the usual feed housing or casing 11 which has a feed chute 12 through the top wall (Fig. 2). Within the housing is a grain receiving hopper formed by a downwardly and forwardly inclined wall 13 secured to the rear wall of the housing and having a substantially vertical screen 14 forming the front wall, the upper end of the screen being supported by a rigid plate or wall section 15 well above the bottom of the hopper. In the bottom of the hopper is a feed roll 16 having slightly helical or spiral beaters 17 arranged to force the grain through the meshes of the screen. Four such beaters are shown and adjacent ones have opposite pitches or wind in opposite directions on the periphery of the feed roller to effect even distribution of the feed. The width of the beaters is sufficient to permit the feed to be deposited more or less evenly or equalized throughout the length of the roll and the wire mesh serves to spread out the feed or prevent any large bulk from passing through the rolls 10 at any one point.

As will be seen from the above description, the idea is to feed the grain continuously to the rolls from the bottom of the hopper. The discharged grain is guided to fall between the rolls by means of a drop pan 18 and a tray 19 arranged in front of the screen. The latter is shown as being so mounted that it is capable of angular adjustment to guide the grain properly.

To regulate the discharge of the grain from the hopper according to the rate of supply of the incoming feed, there is shown a sliding gate 20 in front of the screen 14 adapted to be raised and lowered automatically by the weight of the grain falling in the hopper. Herein, the gate is loosely suspended, as by rings 21, from the upper ends of a pair of arms 22 which are secured to a balance rod or shaft 23. On the lower ends of the arms a feed pan 24 is rigidly secured and extends downwardly into the hopper near the beater or feed roll. The lower end of the pan is shown as being curved or bent at the lower end to provide a bottom wall against which the incoming grain falls and rolls forwardly onto the beater roll. Thus, the weight of the pan and the falling grain counteract the weight of the sliding or regulating gate 20. The gate 20 is herein shown as being guided by thumb screws 25 in angle brackets 26 at the opposite ends of the casing. The screws may be adjusted so as to keep the end of the gate against the screen without any binding action, thus permitting freedom of movement and preventing the grain from crowding or pushing the gate away from the screen.

Now it is very desirable to counterbalance the feed pan and sliding or regulating gate so that the gate will be operated automatically according to changes in the rate of the incoming feed and thereby prevent grain from backing up or partially filling the hopper. Herein, the shaft 23 extends through one end of the housing and has a perforated member 27 in the form of a ball or knob through which a counterweighted rod 28 is inserted. This rod has weights 29 slidably and adjustably mounted on the ends. The rod may also be adjusted so as to effect the proper balance for any constant rate of feed and may be held in position by a thumb screw 30. The whole mechanism is properly balanced for a definite rate of feed and the parts are adjusted as above described. By virtue of the improved counterbalance any slight change in the rate of flow will cause the gate to move or respond almost instantly.

It will now be clear that my improved feeder is adapted to regulate and distribute the feed to milling rolls without depending upon any shaker action or upon the weight of the material in the hopper above the feed gate as is the common flour mill practices. Further, it will distribute conditioned grain, treated with moisture and heat without permitting it to discharge in a bulky stream over a part of the rolls. Thus, the rolls grind uniformly throughout their grinding surfaces and produce a more uniform product. Also, less power is required to drive the rolls. The feed controlling mechanism is entirely automatic in its action and is effective to prevent clogging up the hopper with grain. The thin uniform stream insures that stock will not be caught and ground between stock.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. A grain feeder of the character described comprising, in combination, a hopper having an inlet opening at the top; a sheet metal bottom wall in the hopper; a beater within the hopper; a fixed screen constituting a front hopper wall adjacent to the beater and extending from the front edge of the bottom wall to permit grain to be discharged therethrough; a slidably mounted sheet metal control gate having a rearwardly bent lower edge contacting with the screen to control the discharge opening; a counterbalanceing feed pan connected to the control gate and suspended within the hopper; and a curved portion on the bottom of the counterbalancing pan so arranged that incoming grain falls thereon whereby the rate of flow of the incoming grain controls said gate.

2. A grain feeder of the character described comprising, in combination, a hopper having a discharge opening in its front wall; a beater within the hopper to discharge grain through said opening; a shaft extending across the hopper and having a pair of arms; a control gate freely suspended from the front ends of said arms and co-operating with said opening; a feed pan rigidly connected to the other end of said arms and arranged within the hopper so that incoming grain falls thereon; and adjustable counterbalancing weights operatively connected to said shaft whereby the discharge opening for the grain may be regulated in accordance with the rate of flow of the incoming grain.

3. A grain feeder of the character described comprising, in combination, a pair of rolls; a feeder casing above the rolls; a feed hopper within the casing and having a discharge opening on the side adjacent to the rolls; a feeder roll within the hopper having means to discharge the grain through the opening; a slidable control gate for said discharge opening; a shaft extending across the hopper having a pair of arms from which said control gate is flexibly suspended; means to guide the gate to prevent it from being pushed away from said discharge opening; a counterbalancing feed pan arranged within the hopper and rigidly connected to the opposite ends of said arms; said feed pan having a curved lower end against which the incoming grain is adapted to fall; and a counterweighted rod adjustably connected to said shaft whereby the discharge opening of the hopper may be regulated for a given rate of flow of the incoming grain.

In testimony that I claim the foregoing as my own, I have hereto affixed my signature.

RALPH F. LINDERS.